United States Patent
Olster et al.

(10) Patent No.: US 9,177,034 B2
(45) Date of Patent: Nov. 3, 2015

(54) SEARCHABLE DATA IN AN OBJECT STORAGE SYSTEM

(71) Applicant: DataDirect Networks, Inc., Chatsworth, CA (US)

(72) Inventors: Dan Olster, Oak Park, CA (US); Adam M. Fried-Gintis, Lake Balboa, CA (US); Donald J. Molaro, Cupertino, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 219 days.

(21) Appl. No.: 13/966,108

(22) Filed: Aug. 13, 2013

(65) Prior Publication Data

US 2015/0052167 A1 Feb. 19, 2015

(51) Int. Cl.
*G06F 17/30* (2006.01)

(52) U.S. Cl.
CPC .... *G06F 17/30575* (2013.01); *G06F 17/30545* (2013.01)

(58) Field of Classification Search
CPC combination set(s) only.
See application file for complete search history.

(56) References Cited

U.S. PATENT DOCUMENTS

| | | | |
|---|---|---|---|
| 7,774,345 B2* | 8/2010 | MacLaurin et al. | 707/736 |
| 2006/0155640 A1* | 7/2006 | Kennedy et al. | 705/39 |
| 2006/0168154 A1* | 7/2006 | Zhang et al. | 709/220 |
| 2009/0222884 A1* | 9/2009 | Shaji et al. | 726/1 |
| 2010/0218177 A1* | 8/2010 | Miura | 717/170 |
| 2012/0030339 A1* | 2/2012 | Dumitriu et al. | 709/223 |

* cited by examiner

*Primary Examiner* — Etienne Leroux
(74) *Attorney, Agent, or Firm* — SoCal IP Law Group LLP; Mark A. Goldstein

(57) ABSTRACT

A searchable data storage system is described herein. The storage system includes zones that are independent, and autonomous from each other. The zones include nodes that are independent and autonomous. The nodes include storage devices. When a data item is stored, a local database is updated with information about the newly stored data item. When a search for a data item meeting certain metadata criteria is received, multiple concurrent searches are conducted across all storage devices in all nodes in all zones of the storage system. The configuration of the data storage system allows a parallel concurrent search at constituent storage devices to be performed quickly.

23 Claims, 6 Drawing Sheets

© 2013 DataDirect Networks

SEARCHABLE DATA IN AN OBJECT STORAGE SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to data stored in a data storage system and an improved method for searching for data in a data storage system.

2. Description of the Related Art

A file system is used to store and organize computer data stored as electronic files. File systems allow files to be found, read, deleted, and otherwise accessed. File systems store files on one or more storage devices. File systems store files on storage media such as hard disk drives and solid-state storage devices.

Various applications may store large numbers of documents, images, audio, videos and other data as objects using a distributed data storage system in which data is stored in multiple locations.

DETAILED DESCRIPTION

Environment

Figure 1:
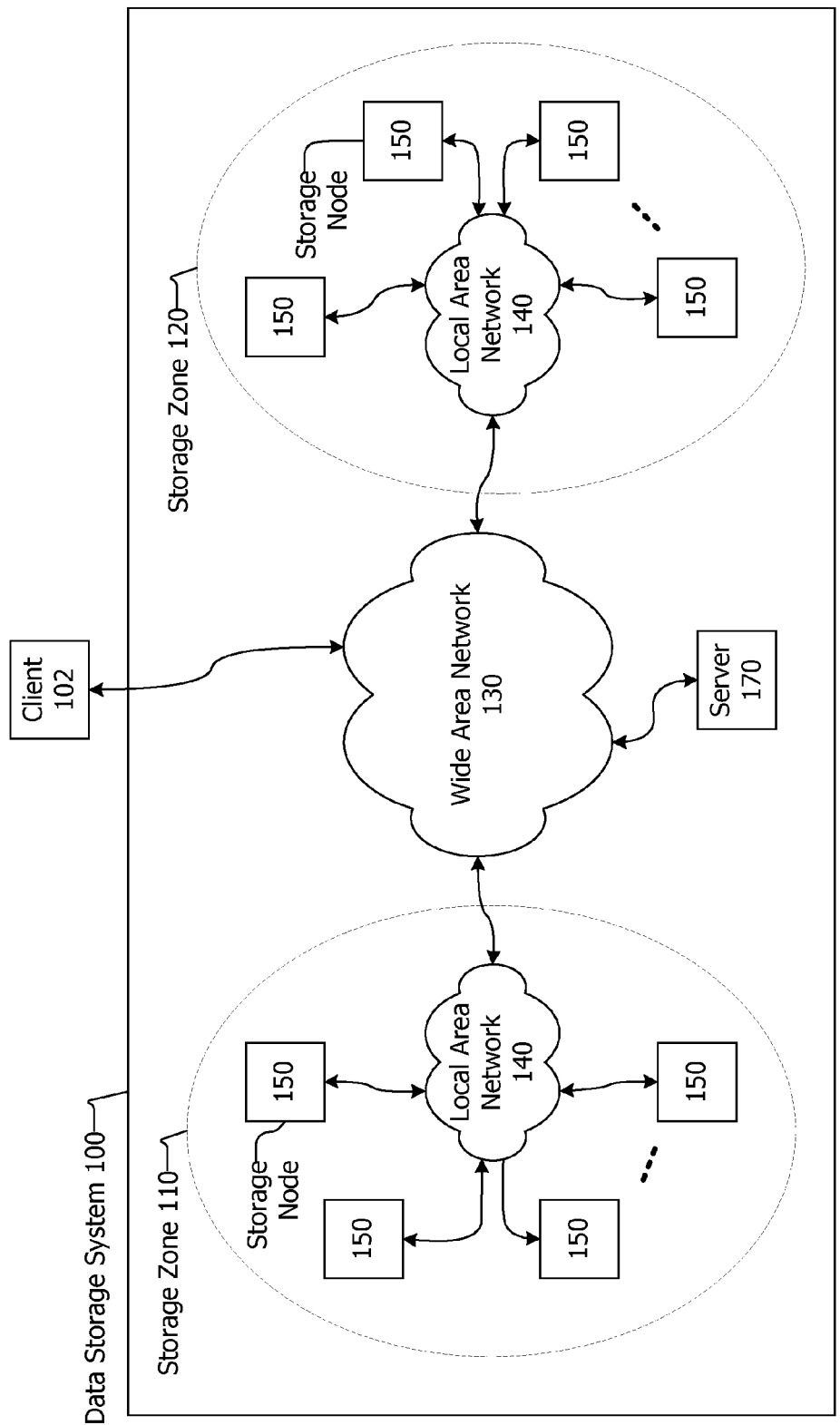
FIG. 1 is a block diagram of a data storage system.

FIG. 1 is a block diagram of a data storage system 100. The data storage system 100 includes at least two storage zones. In another embodiment, the data storage system includes only one zone. The data storage system 100 typically includes multiple storage zones that are independent of one another. The storage zones may be in a peer-to-peer configuration. The storage zones may be geographically dispersed. In the example shown, the data storage system 100 includes two storage zones, first storage zone 110 and second storage zone 120. In other configurations, and more typically, three or more storage zones are included in the data storage system. The storage zones may replicate data included in other storage zones.

The storage zones 110 and 120 may be separated geographically, may be in the same location, may be in separate racks, may be in separate buildings on a shared site, may be on separate floors of the same building, and arranged in other configurations. The storage zones 110 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The distributed data storage system 100 may include a server 170 coupled with wide area network 130. The server 170 may augment or enhance the capabilities and functionality of the data storage system by promulgating policies, receiving and distributing search requests, compiling and/or reporting search results, and tuning and maintaining the system. The server 170 may be considered a management tuning server.

The term data as used herein includes a bit, byte, word, block, stripe or other unit of information. In one embodiment the data is stored within and by the distributed replicated data storage system as objects. As used herein, the term data is inclusive of entire computer readable files or portions of a computer readable file. The computer readable file may include or represent text, numbers, data, images, photographs, graphics, audio, video, computer programs, computer source code, computer object code, executable computer code, and/or a combination of these and similar information.

Many data intensive applications store a large quantity of data, these applications include scientific applications, newspaper and magazine websites (for example, nytimes.com and life.com), scientific lab data capturing and analysis programs, video and film creation software, and consumer web based applications such as social networking websites (for example, FACEBOOK®), photo sharing websites (for example, FLIKR), video sharing websites (for example, YOUTUBE®) and music distribution websites (for example, ITUNES®).

Figure 2:
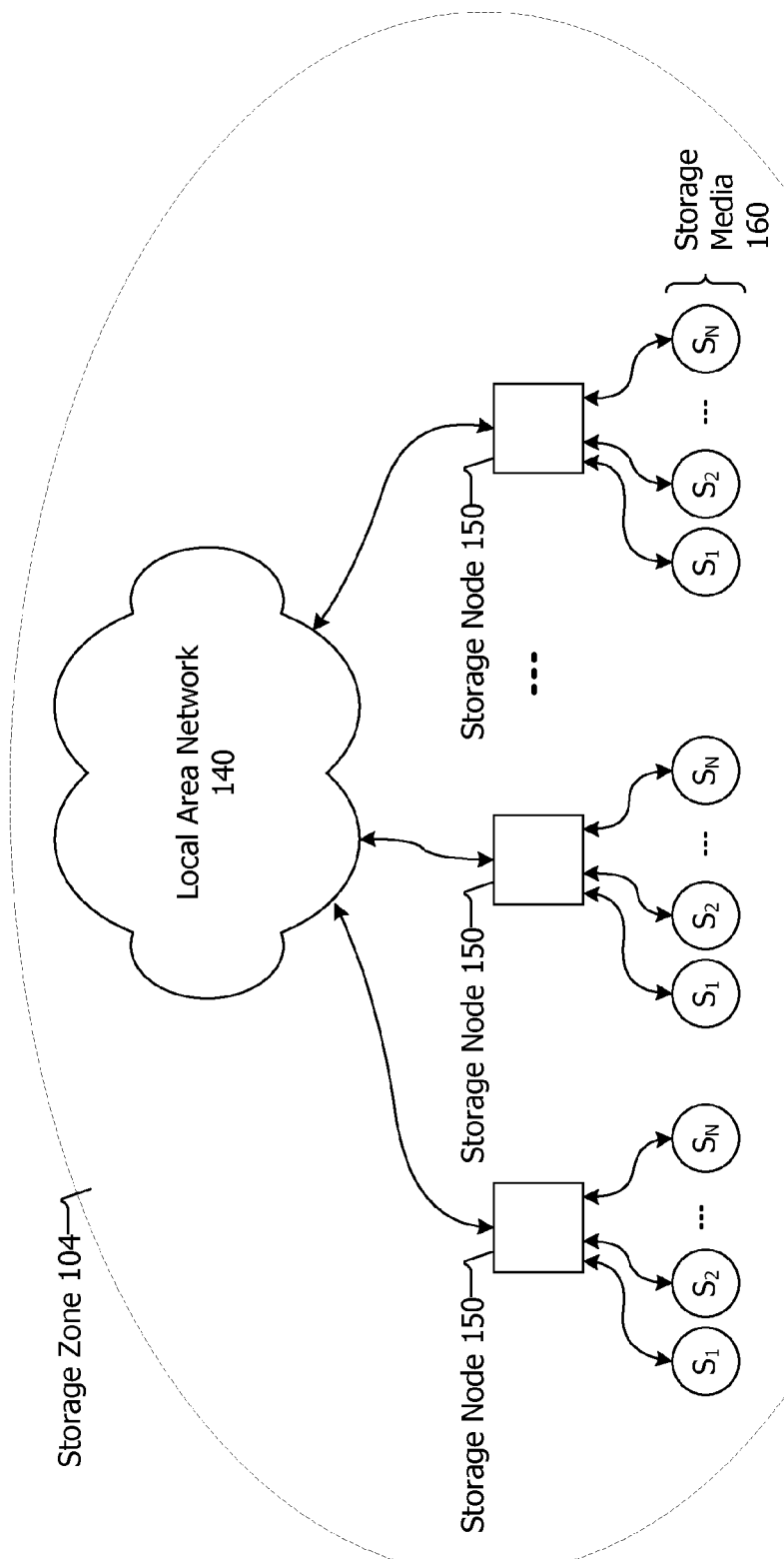
FIG. 2 is a block diagram of a storage zone included in a data storage system.

FIG. 2 is a block diagram of a storage zone 104 included in a data storage system. The storage zones 110 and 120 shown in FIG. 1 are examples of storage zone 104. The storage nodes 150 within a storage zone 104 may be connected via a local area network 140 by wire lines, optical fiber cables, wireless communication connections, and others, and may be a combination of these. The local area network 140 may include one or more networking devices such as routers, hubs, switches and the like.

The storage zones 110, 120 and 104 may include a computing device and/or a controller on which software may execute. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features described herein. The processes, functionality and features described herein may be embodied in whole or in part in software which operates on a controller and/or one or more computing devices and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or computing device, and others by other controllers or computing devices within a storage zone.

A computing device as used herein refers to any device with a processor, memory and a storage device that may execute instructions such as software including, but not limited to, server computers, personal computers, portable computers, laptop computers, smart phones and tablet computers. The computing devices may run an operating system, including, for example, versions of the Linux, Unix, MS-DOS, MICROSOFT® Windows, Solaris, Symbian, Android, Chrome, and APPLE® Mac OS X operating systems. Computing devices may include a network interface in the form of a card, chip or chip set that allows for communication over a wired and/or wireless network. The network interface may allow for communications according to various protocols and standards, including, for example, versions of Ethernet, INFINIBAND® network, Fibre Channel, and others. A computing device with a network interface is considered network capable.

Referring again to FIG. 2, the storage zone 104 includes a plurality of storage nodes 150 which include a plurality of storage media 160. Each of the storage nodes 150 may include one or more server computers. Each of the storage nodes 150 may be an independent network attached storage (NAS) device or system. The term "storage media" is used herein to refer to any configuration of hard disk drives (HDDs), solid-states drives (SSDs), silicon storage devices, magnetic tape, or other similar storage media. Hard disk drives, solid-states drives and/or other storage media 160 may also be arranged in the storage nodes 150 according to any of a variety of techniques.

The storage media included in a storage node may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2 3 and 4 terabytes. Example hard disk drive specifications include Serial Attached Small Computer System Interface (SAS), Serial Advanced Technology Attachment (SATA), and others. An example storage node may include 16 three terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, or a combination of these. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In one embodiment a controller for a node or a designated node, which may be called a primary node, may handle coordination, management and search queries. The coordination and management handled by the controller or primary node include the distribution and promulgation of storage and replication policies. The controller or primary node will also receive search queries from a server, distribute the search queries to all nodes in a storage zone, store the results of search queries as an object, and provide the results of the search to the requesting server.

In another embodiment, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and LLINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane may provide for and support 1, 2, 4, 8, 12, 16, etc. network connections and may have an equal number of network interfaces to achieve this.

The techniques discussed herein are described with regard to storage media including, but not limited to, hard disk drives and solid-state drives. The techniques may be implemented with other readable and writable storage media.

As used herein, a storage device is a device that allows for reading from and/or writing to a storage medium. Storage devices include hard disk drives (HDDs), solid-state drives (SSDs), DVD drives, flash memory devices, and others. Storage media include magnetic media such as hard disks and tape, flash memory, and optical disks such as CDs, DVDs and BLU-RAY® discs.

In some embodiments, files and other data may be partitioned into smaller portions and stored as multiple objects among multiple storage media 160 in a storage node 150. Files and other data may be partitioned into smaller portions referred to as objects and stored among multiple storage nodes 150 in a storage zone. In one embodiment each object includes a storage policy identifier and a data portion. The object including its constituent data portion may be stored among storage nodes and storage zones according to the storage policy specified by the storage policy identifier included in the object. Various policies may be maintained and distributed or known to the nodes in all zones in the distributed data storage system. The policies may be stored on and distributed from a client 102 to the data storage system 100 and to all zones in the data storage system and to all nodes in the data storage system.

As used herein, policies have two components: [1] a replication and placement component and [2] a searchability component. The replication and placement component of a policy defines the replication and placement of data objects in the data storage system. Example replication and placement policies include, full distribution, single copy, single copy to a specific zone, copy to all zone but a specified zone, and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies.

The searchability component of a policy may specify those metadata fields in an object group that are searchable, if any. The searchability component of a policy may include a listing of metadata concerning objects that may be searchable. The searchability component may optionally require specification of those operators that may be used in searching the metadata designated as searchable concerning objects in the object group adhering to the policy. As used herein, metadata is information associated with an object that describes attributes of the object. Metadata may be associated with an object at the time of storage. In some embodiments, metadata may be associated with an object at a later time and/or or modified at a later time.

Referring again to FIG. 1, the client 102 of the storage system 100 may be a computing device such as, for example, a personal computer, tablet, mobile phone, workstation or server. The wide area network 130 may connect geographically separated storage zones. Each of the storage zones includes a local area network 140.

The data storage systems described herein may provide for one or multiple kinds of storage replication and data resiliency. The data storage systems described herein may operate as a fully replicated distributed data storage system in which all data is replicated among all storage zones such that all copies of stored data are available from and accessible from all storage zones. This is referred to herein as a fully replicated storage system. Replication may be performed synchronously, that is, completed before the write operation is acknowledged; asynchronously, that is, the replicas may be written before, after or during the write of the first copy; or a combination of each. This configuration provides for a high level of data resiliency.

Another configuration of a data storage system provides for partial replication such that data may be replicated in one or more storage zones in addition to an initial storage zone to provide a limited amount of redundancy such that access to data is possible when a zone goes down or is impaired or unreachable, without the need for full replication. The partial replication system does not require that each zone have a full copy of all data objects. Another configuration of a data storage system is when no replication exists such that data is stored solely in one storage zone. However, resiliency may be provided by using intra-zone techniques such as by a RAID or other configuration.

To facilitate the replication of objects in the data storage system, objects with identical policies are grouped together as object groups. That is, objects having the same replication and placement specification and searchability specification are grouped together as an object group. These groups represent collections of objects the storage system treats as a unit for the purposes of replication and search. In some embodiments of the storage system the number of objects in an object group may be 16K, 32K, 64K or more. The number of objects in an object group may be fixed, or variable based upon a configuration parameter of the system, or variable based upon the policy. In other embodiments of the data storage system the searchable metadata may be stored separately from other objects in the object group but within a group of storage devices under the same controller. In other embodiments of the data storage system the searchable metadata may be stored external to a particular object group or zone, and may even be stored in another system associated with the object group.

To facilitate the usage of object groups the system is configured to store an entire (that is, full, complete) object group on a single storage device. As an object group is typically smaller than the capacity of a storage device, a plurality of object groups, each of which may have different policies, are stored on a storage device. That is, each object group has different replication requirements and searchable metadata from other object groups stored on the same storage device.

Figure 3:
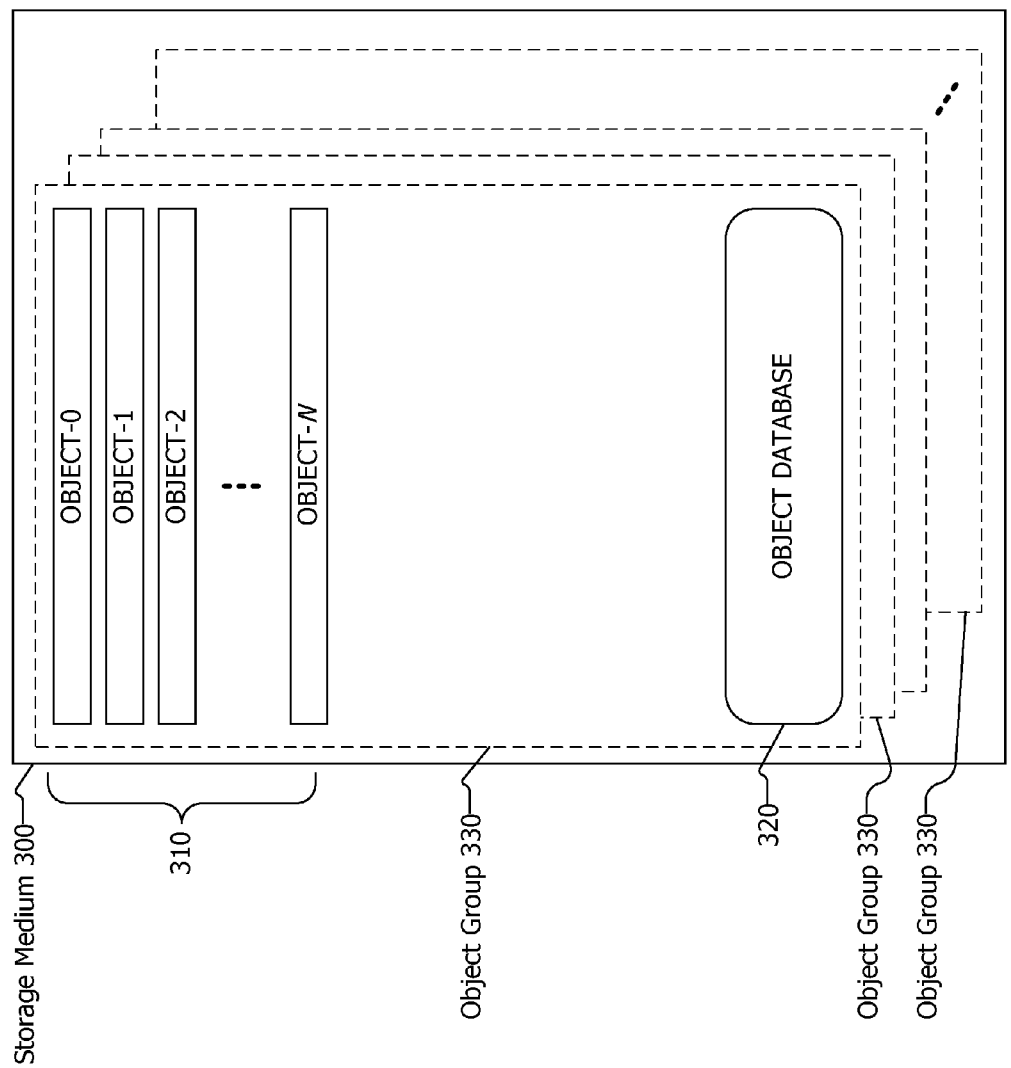
FIG. 3 is a block diagram of a storage device and an object group stored thereon.

Referring now to FIG. 3, a block diagram of a storage medium 300 and object groups 330 stored thereon is shown. The storage medium is included in a storage device. To allow for efficiently and quickly searching for objects based on metadata (also referred to as object specific information) about stored objects, an object database 320 may be stored with each object group. Each storage media 300 includes an object group 330. The object group 330 includes multiple objects 310 stored on the storage device as well as the object database 320. The object database 320 may be stored and handled as an object itself.

When objects 310 are stored on the storage device, object specific information including certain metadata about the objects are stored in the object database 320. The object database 320 may be indexed according to the object identifier or OIDs of the objects stored on the storage device. In one embodiment, each entry in the object database 320 is limited to 256 bytes or less of data per object. Thus the object database may only store a small amount of information for each object. In alternative embodiments the object database is larger to allow for the storage of a larger number of fields or larger amount of object specific information or metadata. The maximum size of the embedded object databases may be a configuration parameter of the system or it may be a parameter of the policy that the objects are stored under. Example metadata fields that may be stored in the object database as object specific information include a user identifier or UID for the author or owner or caretaker of the object, and pertinent time information for the object, including time created and time stored, and may include ATIME, CTIME and MTIME values for the object. Additional fields may also be stored as metadata regarding the object such as a code or designator or text name for [a] the kind of data represented by the object, including, for example, image, video, audio, text document, and the like, and/or [b] the content of the data, such as, for example, name of person or location or subject, and/or [c] geo-location of where the data was obtained or captured, and/or [d] other information concerning the object. The fields or entries in the object database may be stored as field/value pairs. The object database may be searchable according to a multiple operators including "equal", "or", "and", "less than" and "greater than". In one embodiment the object database may be an SQLITE® database. In other embodiments the database may be a MONGODB® or other key-value store.

Figure 4:
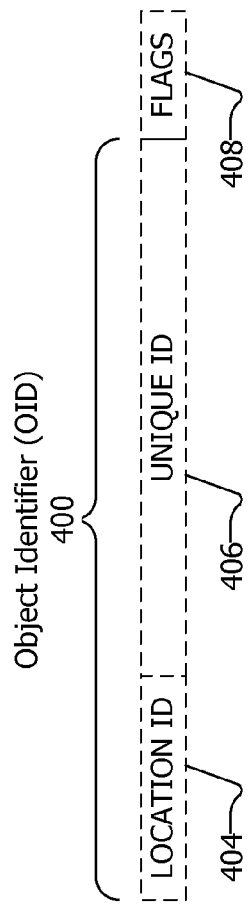
FIG. 4 is a block diagram of an object identifier (OID) for objects stored and managed by the data storage system.

The objects and the object database may be referenced by object identifier or OIDs like those shown and described regarding FIG. 4. Referring now to FIG. 4, a block diagram of an object identifier used in the data storage system is shown. According to the data storage system described herein, an object identifier 400 includes two components and may include three or more components. The object identifier 400 includes a location identifier 404 and a unique identifier 406. The object identifier 400 may optionally include flags 408 and other fields. The location identifier 404 specifies a device, address, storage node or nodes where an object resides. The specific format of the location identifier may be system dependent.

In one version of the system, the object identifier 304 may include both a group identifier ("group ID") and an index. The group ID may represent a collection of objects stored under the same policy, and having the same searchable metadata fields; the group ID of the object becomes a reference for the embedded database of the object group. The group ID may be used to map the object to a particular storage node or storage device, such as a hard disk drive. The mapping may be stored in a mapping table maintained by the object storage system. The mapping information is distributed and is hierarchical. More specifically, the system stores a portion of mapping information in memory, and the storage nodes hold a portion of the mapping information in their memory. Master copies of the mapping information are kept on disk or other nonvolatile storage medium on the storage nodes. The master copies of the mapping information are dynamically updated to be consistent with any changes made while the system is active. The index may be the specific location of the object within the group. The index may refer to a specific location on disk or other storage device.

The unique identifier 406 is a unique number or alphanumeric sequence that is used to identify the object on the particular medium. The unique identifier 406 may be randomly generated, may be the result of a hash function of the object, may be the result of a hash function on the metadata of the object, or may be created using another technique. In one embodiment the unique identifier is assigned by the controller in such a manner that the storage device is used efficiently. The unique identifier 406 may be stored as 24 bits, 32 bits, 64 bits, 128 bits, 256 bits, 512 bits, 1 kbyte, etc. The total size of the object identifier may be, for example, 128 bits, 256 bits, 512 bits, 1 kbyte, 4 kbytes, etc. In the one embodiment, the total size of the object identifier includes the sum of the sizes of the location identifier, unique identifier, flags, policy identifier, and version id. In other embodiments, the object identifier includes additional data that is used to obfuscate the object identifier. The unique identifier 406 is stored within the object identifier itself.

The object identifier 400 may optionally include flags 408. Flags 408 may be used to distinguish between different object types by providing additional characteristics or features of the object. The flags may be used by the data storage system to evaluate whether to retrieve or delete objects. In one embodiment, the flags associated with the object indicate if the object is to be preserved for specific periods of time, or to authenticate the client to ensure that there is sufficient permission to access the object. In other embodiments, other kinds and formats of OIDs may be used.

In some embodiments, when the data objects are large, the data object may be partitioned into sub-objects. The flags 408 may be useful in the handling of large data objects and their constituent sub-objects. Similarly, the group ID may be included as part of the location ID 404, and may be used in mapping and reassembling the constituent parts of large data objects.

Processes

Figure 5:
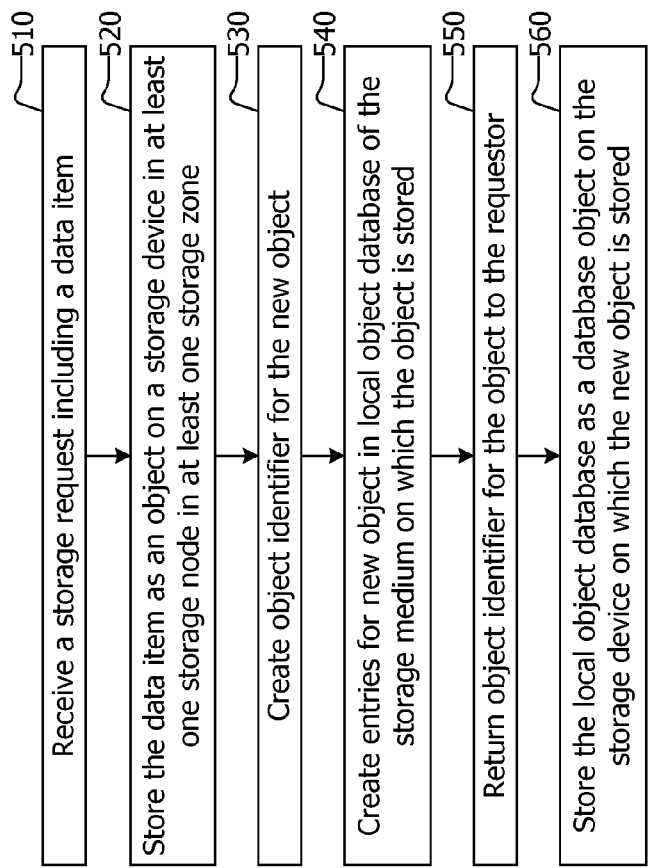
FIG. 5 is a flow chart of the actions taken to store or put data in a data storage system.

Referring now to FIG. 5, a flow chart of the actions taken to store or put data in a data storage system is shown. To store or put a data item, the system receives a storage request that includes a data item (or reference or link to a data item) and may include storage criteria, and may include a set of metadata, as shown in block 510. The storage request may be received from a client application running on a client device. The storage criteria may, in different embodiments specify the storage policy for the data item by a code or name, which may include [1] a replication and placement component and [2] a searchability component. The replication and placement component may include specific distribution instructions for the data item, and the searchability component may include a definition of which metadata for the object is to be searchable. The specific distribution instruction may specify the number of zones in which the data item should be stored, the number of nodes in which the data items should be stored, a specific redundancy scheme identifier, and the like. In another implementation, the specific distribution instructions and/or the searchability of metadata may be hard coded or system defined or earlier set by a system administrator.

The system then stores the data item as an object on a storage device in at least one storage node in at least one storage zone, as shown in block 520. In one embodiment, the system stores the data item as an object according to a policy (representing specific distribution instructions and a definition of which metadata fields are to be searchable) provided with the request or otherwise included in the system such that the data item is stored on at least one storage device in at least one storage node in at least one storage zone. The system creates an object identifier for the new object, as shown in block 530.

The system then creates entries for the new object in the local database of the object group on which the object is stored, as shown in block 540. The database entries for the object are populated with object specific information or metadata according to the definition of the policy associated with the object. The kind and content of the database may vary depending on implementation.

In one embodiment, the database entries for objects include an object identifier or OID and the object specific information or metadata include some or all of a user identifier or UID for the author or owner or caretaker of the object, and pertinent time information for the object, including time created and time stored, and may include ATIME, CTIME and MTIME values for the object. Additional object specific fields may also be stored as metadata regarding the object such as a code or designator or text name for [a] the kind of data represented by the object, including, for example, image, video, audio, text document, and the like, and/or [b] the content of the data, such as, for example, name of person or location or subject, and/or [c] geo-location of where the data was obtained or captured, and/or [d] other information concerning the object. Information for these additional fields may be obtained by extracting existing metadata already included with the object or simple analysis of the object.

The configuration of the storage device with objects and an object database is shown in FIG. 3 and described above.

After the object is stored and the OID is created, the OID may be returned to the requester, as shown in block 550. Returning of the OID to the request may occur concurrently with or after object database entries for the object are created. That is, the actions of block 550 may occur before the actions of block 540 or concurrent therewith. The local object database may be stored as a database object on the storage medium on which the new object is stored, as shown in block 560. In this way, redundancy or other similar storage and replication policies applicable to objects in the node and/or zone in which the storage medium exists are applied to the database object such that the resiliency of the database object is ensured.

Figure 6:
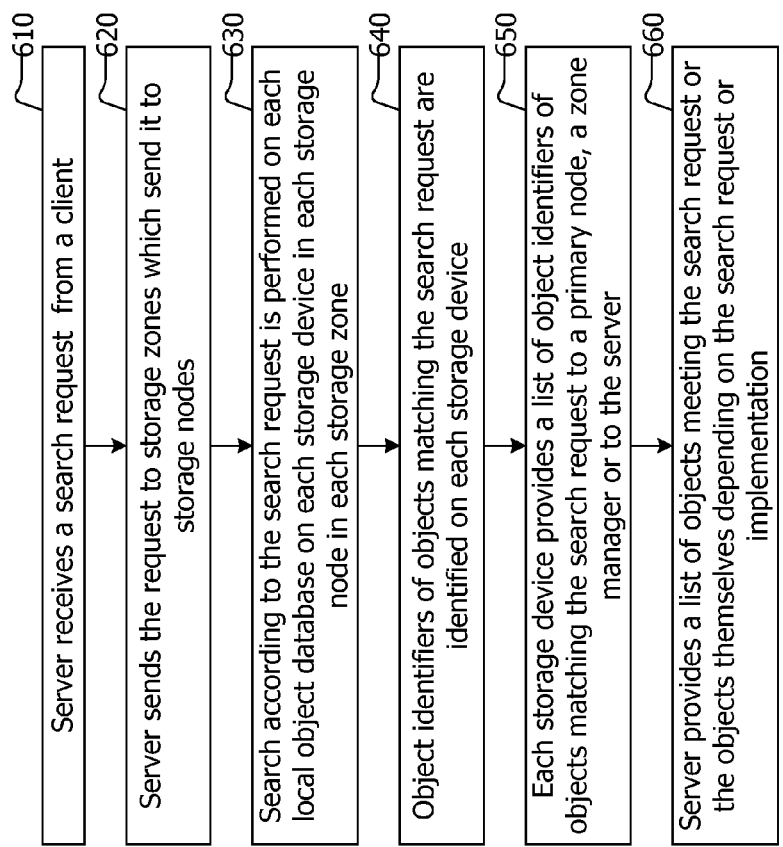
FIG. 6 is a flow chart of the actions taken to search for data included in a data storage system.

FIG. 6 is a flow chart of the actions taken to search for data included in a data storage system. A server, such as server 170 shown in FIG. 1, receives a search request from a client, as shown in block 610. The request includes at least one value, at least one field and at least one operator. The options for these are defined above in the discussion regarding FIG. 3. The server then sends the request to storage zones which send the request to storage nodes, as shown in block 620. In this way, the search request is distributed throughout the entire storage system and the search is conducted in parallel across the storage system. That is, the search according to the search request is performed on each object database within each object group, in each storage device in each storage node in each storage zone, as shown in block 630. By distributing the search, a quick result may be obtained with limited impact on the storage processing capabilities of the system. Moreover, object groups with policies that specify certain metadata is searchable may be bypassed when the sought out field is not in the searchability component of the policy for the object group. That is, object groups for which the field specifies metadata that is not searchable according to a group policy for the object group are bypassed. This results in increased search throughput. This results in increased search speed. In one embodiment, object groups that have a policy specifying the searchability of the specified field are identified, and only databases in those object groups are searched according to the request.

Object identifiers of objects matching the search request are identified on each storage device, as shown in block 640. Depending on the specific implementation, each storage device provides a list of object identifiers of objects matching the search request to a primary node, or a zone manager or to the server, as shown in block 650. The list of object identifiers of objects matching the search request may be referring to as a matching list or local matching list. The matching list may be stored as and provided as an object. In one embodiment, each storage device provides a list of object identifiers of objects matching the search request, a matching list or local matching list, to a primary node, the primary node provides the local matching lists to a zone manager, and the zone manager provides the matching lists from its constituent nodes to the server. In another embodiment, each storage device provides a list of object identifiers of objects matching the search request to a zone manager and the zone manager provides the matching list to the server. The primary node or controller may combine the local matching lists into a list of objects meeting the search request or node matching list. The zone manager may combine the local matching lists or node matching lists into a list of objects meeting the search request or zone matching list.

The server then provides a list of objects meeting the search request or the objects themselves depending on the search request or implementation, as shown in block 660.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A data storage system comprising:
   a plurality of storage zones, each storage zone comprising a plurality of nodes wherein each node comprises a plurality of storage devices and a controller, the controller including a processor and memory
   a first node of a plurality of nodes included in a first zone of the plurality of storage zones, the first node having instructions which when executed cause a first processor included in a first controller in the first node to perform actions including:
   receiving a storage request from a client of the data storage system to store a data item;
   storing the data item as at least one data object on a first storage device included in the first node, each data object including a policy identifier and a data portion, the storing including creating an object identifier for the data object;
   creating an entry in a local object database included on the first storage device on which the data object is stored, the entry including the object identifier and object specific information;
   storing the local object database as a database object on the storage device on which the data object is stored;
   receiving a search request including a field, a value and an operator;
   applying the search request to constituent storage devices;
   compiling a matching list of objects conforming to the search request based on the applying;
   providing the matching list to a server.

2. The data storage system of claim 1 wherein the storage devices are hard disk drives and/or solid state storage devices.

3. The data storage system of claim 1 wherein the object specific information includes at least one selected from the group including a user identifier (UID), a time, a kind of data, a content of the data object, a geo-location.

4. The data storage system of claim 1 wherein the policy includes a replication and placement component specifying replication and placement requirements of the data object in the data storage system, and a searchability component specifying metadata fields of the data object that are searchable.

5. The data storage system of claim 4 wherein the storing the data item includes storing the data item as part of an object group of other data items that have the same policy.

6. The data storage system of claim 4 wherein the applying the search request to constituent storage devices includes bypassing object groups for which the field specifies metadata that is not searchable according to the searchability component of a group policy for the object group.

7. The data storage system of claim 4 wherein the applying the search request to constituent storage devices includes evaluating each object group to determine whether the searchability component of a group policy of the object group specifies the field as searchable metadata.

8. The data storage system of claim 1 wherein the operator is selected from the group including "equal", "or", "and", "less than" and "greater than".

9. The data storage system of claim 1 wherein the field is selected from the group including a user identifier (UID), a time, a kind of data, a content of the data object, a geo-location.

10. A data storage system comprising:
   a plurality of storage zones, each storage zone comprising
      a plurality of storage nodes wherein each storage node comprises a plurality of storage devices and a controller, each controller including a processor and memory, each controller having instructions which when executed cause the processor to perform actions including:
         storing a plurality of data items as at least one data object on one of the storage devices, each data object including a policy identifier and a data portion, the storing including:
            creating an object identifier for the data object,
            creating an entry in a local object database included on the storage device on which the data object is stored, the entry including the object identifier and object specific information,
            storing the local object database as a database object on the storage device on which the data object is stored;
         receiving a search request including a field, a value and an operator;
         applying the search request to constituent storage devices;
         compiling a matching list of objects conforming to the search request based on the applying;
         providing the matching list to a server.

11. The data storage system of claim 10 wherein the storage devices are hard disk drives and/or solid state storage devices.

12. The data storage system of claim 10 wherein the object specific information includes at least one selected from the group including a user identifier (UID), a time, a kind of data, a content of the data object, a geo-location.

13. The data storage system of claim 10 wherein the policy includes a replication and placement component specifying replication and placement requirements of the data object in the data storage system, and a searchability component specifying those metadata fields of the data object that are searchable.

14. The data storage system of claim 13 wherein the storing the data item includes storing the data item as part of an object group of other data items that have the same policy.

15. The data storage system of claim 14 wherein the applying the search request to constituent storage devices includes bypassing object groups for which the field specifies metadata that is not searchable according to the searchability component of a group policy for the object group.

16. The data storage system of claim 14 wherein the applying the search request to constituent storage devices includes checking object groups to determine whether a group policy for the object group includes a searchability component specifying metadata corresponding to the field is searchable.

17. The data storage system of claim 10 wherein the operator is selected from the group including "equal", "or", "and", "less than" and "greater than".

18. The data storage system of claim 10 wherein the field is selected from the group including a user identifier (UID), a time, a kind of data, a content of the data object, a geo-location.

19. A method for searching for data in a data storage system, the method comprising:
   receiving a search request including a field, a value and an operator;
   distributing the search request to each storage device of a plurality of storage devices in each storage node of a plurality of storage nodes within at least one storage zone, at each storage device concurrently performing the following actions:
      evaluating object groups to determine whether a group policy for the object group includes a searchability component specifying that metadata corresponding to the field is searchable,
      bypassing searching those data objects in object groups for which the searchability component fails to specify that metadata corresponding to the field is searchable,
      searching those data objects in object groups for which the searchability component specifies that metadata corresponding to the field is searchable, the searching based on the search request;
   compiling a matching list of objects conforming to the search request;
   providing the matching list to a server.

20. The method of claim 19 wherein the searching further comprises:
   providing a list of objects meeting the search request to one of a primary node or a controller as a local matching list.

21. The method of claim 20 wherein the compiling further comprises:
   combining the local matching lists of objects of a plurality of nodes to form the matching list of objects.

22. The method of claim 19 wherein the operator is selected from the group including "equal", "or", "and", "less than" and "greater than".

23. The method of claim 19 wherein the field is selected from the group including a user identifier (UID), a time, a kind of data, a content of the data object, a geo-location.

* * * * *